United States Patent [19]

Padget et al.

[11] Patent Number: 4,783,498

[45] Date of Patent: Nov. 8, 1988

[54] AQUEOUS LATEX COPOLYMER COMPOSITIONS

[75] Inventors: John C. Padget, Frodsham; Donald H. McIlrath, Liverpool, both of United Kingdom

[73] Assignee: Imperial Chemical Industries PLC, London, England

[21] Appl. No.: 800,213

[22] Filed: Nov. 21, 1985

[30] Foreign Application Priority Data

Dec. 6, 1984 [GB] United Kingdom ............ 8430858
Feb. 21, 1985 [GB] United Kingdom ............ 8504456
Apr. 15, 1985 [GB] United Kingdom ............ 8509560
May 20, 1985 [GB] United Kingdom ............ 8512685
Jul. 31, 1985 [GB] United Kingdom ............ 519224

[51] Int. Cl.$^4$ .................................................. C08L 27/00
[52] U.S. Cl. ................................. 524/519; 524/522; 524/523; 524/527; 524/560
[58] Field of Search ............ 524/522, 519, 523, 527

[56] References Cited

U.S. PATENT DOCUMENTS

| | | | |
|---|---|---|---|
| 3,787,232 | 1/1974 | Mikofalvy et al. | 117/138.8 |
| 4,341,679 | 7/1982 | Burgess et al. | 428/500 |
| 4,543,386 | 9/1985 | Padget et al. | 524/522 |
| 4,543,387 | 9/1985 | Padget et al. | |

FOREIGN PATENT DOCUMENTS 48-68627  9/1973  Japan ................................. 524/523

OTHER PUBLICATIONS

"Structure and Properties of Polymers" Boenig, 1973, pp. 256–260.

*Primary Examiner*—Joseph L. Schofer
*Assistant Examiner*—N. Sarofim
*Attorney, Agent, or Firm*—Cushman, Darby & Cushman

[57] ABSTRACT

Aqueous latex compositions for use as contact adhesives comprising a mixture of an amorphous copolymer A and an amorphous copolymer B and preferably a tackifying resin where A comprises units of vinylidene chloride, an internally plasticizing comonomer like 2-ethylhexyl acrylate or n-butyl acrylate, and optionally a copolymerizable acid, and has Tg in the range $-50°$ to $<0°$ C. and B comprises units of vinylidene chloride, an alkyl acrylate and/or methacrylate or certain other comonomers, and optionally a copolymerizable acid, and has a Tg in the range $0°$ to $80°$ C., and wherein copolymer A has a modal molecular weight Mp within the range 100,000 to 700,000.

25 Claims, No Drawings

AQUEOUS LATEX COPOLYMER COMPOSITIONS

The present invention relates to aqueous latex copolymer compositions which are particularly suitable for use in the provision of contact adhesives.

A contact adhesive is a substance which when coated on two substrates to be bonded enables a strong bond to be formed between the substrates on and after initial contact at ambient temperature without the requirement of any sustained pressure setting time. The contact adhesive is applied to each substrate dissolved or dispersed in a liquid medium, the solutions or dispersions allowed to dry on each substrate, and the dried adhesive layers undergo rapid interfilm coalescence on contact to form almost instantaneously a strong bond; this property is known as contactability.

In the past, contact adhesives have usually been applied as solvent-based compositions, i.e. in compositions wherein the adhesive substance has been dissolved in an organic liquid solvent. However, in recent years attention has been focussed on the toxicity, flammability and pollution problems associated with such systems. This has stimulated a desire to employ systems where the contact adhesive is less hazardously applied as an aqueous-based composition, i.e. in a composition wherein the adhesive substance is dispersed in water.

Currently, aqueous-based contact adhesive compositions appear to be mainly of two types: Neoprene or modified Neoprene-type compositions and acrylate-type compositions. Examples of the former type are described in U.S. Pat. No. 4,130,528 while examples of the latter type are described in U.S. Pat. Nos. 2,976,203, 2,976,204, 4,057,527, 4,280,942, and British patent No. 1459843. The search for new aqueous-based contact adhesive compositions nevertheless continues with the objective of obtaining an improved balance of properties such as contactability, mature bond strength and high temperature creep performance.

In an initial approach to this problem we discovered that certain aqueous latex compositions comprising mixtures of two different types of copolymers were possessed of excellent utility as contact adhesive compositions. One such aqueous latex composition comprises a mixture of an amorphous copolymer (type A) comprising polymerised units of vinylidene chloride, an internally plasticising comonomer like 2-ethylhexyl acrylate or n-butyl acrylate, optionally vinyl chloride and optionally a copolymerisable acid, and having Tg in the range −50° to <0° C., and another amorphous copolymer (type B) comprising polymerised units of vinylidene chloride, an alkyl acrylate and/or methacrylate or certain other comonomers, optionally vinyl chloride, and optionally a copolymerisable acid, and having Tg in the range 0° to 30° C. This type of composition is described in our European Patent Publication No. 0119698. Another such aqueous latex composition comprises a mixture of an amorphous copolymer (type A) comprising polymerised units of certain selected monomers preferably including vinylidene chloride, an internally plasticising comonomer like 2-ethylhexyl acrylate or n-butyl acrylate, optionally vinyl chloride, and optionally a copolymerisable acid, and having Tg in the range −50° to <0° C., and a crystalline copolymer (type B) comprising polymerised units of vinylidene chloride, and having a Tg which is not more than 30° C. This type of composition is is described in our European Patent Publication No. 0119699. As an optional feature in these aqueous latex compositions, both types of copolymer in each composition can include polymerised units of a comonomer which provides a cross-linking functionality, such a comonomer causing cross-linking during the polymerisation to form the copolymer and/or providing a latent cross-linking functionality whereby cross-linking occurs after the copolymer has been formed (e.g. on or after bond formation) either under the influence of an added cross-linking agent or without the requirement for such an agent.

We have now discovered that the aqueous latex compositions of the type described in European Patent Publications Nos. 0119698 and 0119699 may be further improved by careful selection of the modal molecular weight of the copolymer of type A in either composition. The present application is directed towards the improved compositions of European Patent Publication No 0119698, while our copending application of even date is directed towards the improved compositions of European Patent Publication No 0119699.

According to the present invention there is provided an aqueous latex composition comprising at least one copolymer A and at least one copolymer B, wherein: A is an amorphous copolymer comprising polymerised units of vinylidene chloride and at least one internally plasticising comonomer; and which copolymer has a Tg in the range from −50° to <0° C.; and B is an amorphous copolymer comprising polymerised units of vinylidene chloride and at least one comonomer selected from alkyl acrylates and methacrylates having 1 to 12 carbon atoms in the alkyl group, alkoxyalkyl acrylates and methacrylates having 1 to 12 carbon atoms in the alkyl group, styrene, acrylonitrile, vinyl acetate and vinyl ethyl ether; and which copolymer has a Tg in the range from 0° to 80° C.; and wherein the dry weight ratio of the at least one copolymer A: the at least one copolymer B is from 95:5 to 10:90; and wherein said at least one copolymer A has a modal molecular weight Mp (as herein defined) within the range 100,000 to 700,000; and wherein said composition provides contactable layers after drying.

There is also provided according to the invention the use of an aqueous latex as defined above as a contact adhesive-forming composition. In accordance with the conventional method of contact bonding, such use is generally effected by coating two substrates to be bonded with the said aqueous latex composition, allowing the aqueous coating on each substrate to dry, and bringing the dry coated substrates into contact usually at ambient temperature and usually without any sustained pressure to effect contact.

The new aqueous latex compositions of the present invention possess a still further advantageous combination of properties for contact adhesive purposes than compositions exemplified in European Publication No 0119698 in which all copolymers A used in those examples had Mp well below 100,000, and in particular provide consistently improved combinations of shear strength and creep resistance for dried layers as well as having comparably good other properties such as contactability and 7-day bond strength.

In this specification, modal molecular weight Mp is defined as the molecular weight at the peak maximum of the molecular weight distribution curve obtained using a gel permeation chromatograph packed with beads of divinyl benzene gel and calibrated with polystyrene samples of known molecular weight and narrow molecular weight distribution (Weight Average Molecular Weight Mw/Number Average Molecular Weight $M_n = 1.05$ to 1.07) to give a linear calibration between polystyrene molecular weights of 1000 and $3.6 \times 10^6$. The weight average and number average molecular weights $M_w$ and $M_n$ and hence the heterogeneity index may also be determined from this distribution curve. The vinylidene chloride copolymer and polystyrene samples for gel permeation chromatography are used as solutions of 0.02 g polymer in 10 ml of H.P.L.C. grade tetrahydrofuran.

It is to be understood that the value of Mp used herein is the measurement obtained using only substantially gel-free copolymer. A copolymer A as used according to the invention may, if desired (although usually it is not preferred), have a degree of cross-linking that has been produced during the polymerisation; this may result in a proportion of gel which, in a sample to be used for the estimation of Mp, is removed by filtration of the tetrahydrofuran solution to be injected into the gel permeation chromatograph before the measurement of Mp.

The vinylidene chloride copolymer A of the invention should have Mp within the range 100,000 to 700,000; if its Mp is below 100,000, an aqueous composition having the improved balance of contact adhesive properties tends not to be obtained. A modal molecular weight Mp of above 700,000 is in our experience unattainable for the copolymer A of this invention due to competing chain transfer reactions during polymerisation. The vinylidene chloride copolymer A of the invention usually has Mp within the range 100,000 to 500,000, and more usually within the range 100,000 to 400,000; nevertheless vinylidene hloride copolymers A with Mp within the range 500,000 to 700,000 are not excluded from the present invention.

The Mp of copolymer B is not critical in the present invention and can e.g. be below or above 100,000; there appears however, to be no advantage for the Mp of B to be above 100,000 rather than below 100,000 (as there is in the case of copolymer A).

By Tg is meant the glass transition temperature and it will be noted the Tg of copolymer B is not restricted to being 0° to 30° C. as in the compostitions of European Publication No. 0119698 but can have Tg in the range 0° to 80° C.

The copolymer A may optionally comprise polymerised units of vinyl chloride and may optionally comprise polymerised units of at least one copolymerisable ethylenically unsaturated acid. The copolymer B may optionally comprise polymerised units of vinyl chloride and may optionally comprise polymerised units of at least one copolymerisable ethylenically unsaturated acid.

Both copolymers A and B are amorphous (with less than 5% and more usually substantially zero crystallinity), being non-crystalline in the latex and not crystallising on and/or after removal of the aqueous medium—as e.g. on and/or after bond formation. (Crystalline polymers tend to yield films of zero contactability and so it would not be useful for both A and B to be crystalline).

The weight ratio of the at least one copolymer A: the at least one copolymer B is from 95:5 to 10:90. The preferred range is 85:15 to 15:85, particularly 80:20 to 20:80 (with 75:25 to 25:75 being a typical range in practice).

The aqueous latex compositions of the invention normally comprise only one copolymer A and only one copolymer B, although it is within the scope of the invention to include more than one copolymer A and/or more than one copolymer B. Other addition polymers may also be included if they have no deleterious effect.

The disposition of copolymers A and B in the aqueous latex composition of the invention is in the form of a mixture of the copolymers. This mixture may e.g. be a simple aqueous latex blend of the at least one copolymer A and the at least one copolymer B prepared by blending together aqueous latices of the separately prepared copolymers. Alternatively, the mixture may be made in-situ by forming the at least one copolymer A in the presence of the at least one copolymer B, or vice versa, using a sequential polymerisation process. When more than one copolymer A and/or copolymer B is used, these may be mixed by simple blending, or by a sequential polymerisation process, or by a combination of simple blending and sequential polymerisation.

The Tg of a copolymer will primarily be determined by the types and amounts of the individual comonomer units in the copolymer. Accordingly a variety of copolymers may readily be prepared having Tg within the ranges specified.

It may be noted that the Tg of a vinylidene chloride copolymer cannot be determined from a formula; instead it is necessary to determine the Tg of such a copolymer by experiment. Typical examples of Tg verses composition relationships for vinylidene chloride copolymers are given in: "Polyvinylidene Chloride", R A Wessling, Gordon and Breach, Science Publishers 1977.

The composition of copolymer A should be selected to provide a Tg in the range from $-50°$ to $<0°$ C., and more preferably in the range from $-40°$ to $-5°$ C.

Preferred copolymer compositions for A are copolymers comprising 10 to 70 weight % of polymerised units of vinylidene chloride, 30 to 90 weight % of polymerised units of at least one internally plasticising comonomer, 0 to 20 weight % of polymerised units of vinyl chloride, and 0 to 10 weight % of polymerised units of at least one copolymerisable ethylenically unsaturated acid. Minor amounts of polymerised units of at least one other ethylenically unsaturated comonomer may optionally be included in these preferred polymeric compositions of A (e.g. 0 to 40 weight % or 0 to 20 weight %), for example polymerised units of at least one ethylenically unsaturated comonomer such as an alkyl acrylate or methacrylate (or alkoxyalkyl acrylate or methacrylate) having 1 to 18 carbon atoms in the alkyl group which is not an internally plasticising comonomer (such as ethyl acrylate, methyl methacrylate, or n-butyl methacrylate), acrylonitrile, styrene, vinyl acetate, vinyl ethyl ether, or a monomer which imparts a specific functionality (e.g. a cross-linking functionality) may be included.

The proportion of polymerised units of vinylidene chloride in the above-mentioned preferred copolymer compositions for A is more preferably 20 to 60 weight %.

By an internally plasticising comonomer is meant a comonomer which gives a homopolymer (when polymerised alone) of very low Tg, preferably $\leq -40°$ C., more preferably $\leq -50°$ C., and so provides copolymerised units in a copolymer which (if present in sufficient proportion) tend to cause the copolymer to be intrinsically plasticised and thereby have considerably lowered Tg in comparison to a polymer not having such units. Thus the use of such comonomers allows various desired values of Tg to be readily achieved. Suitable plasticising comonomers include certain kinds of alkyl and alkoxyalkyl acrylates such as n-butyl acrylate, 2-ethylhexyl acrylate, n-decyl methacrylate, n-octyl acrylate, 2-ethylbutyl acrylate, n-heptyl acrylate, 2-heptyl acrylate, n-hexyl acrylate, 3-methylbutyl acrylate, n-nonyl acrylate, 2-octyl acrylate, n-propyl acrylate, 1-ethoxyethyl acrylate, 1-ethoxypropyl acrylate, 2-methoxyethyl acrylate, 3-methoxypropyl acrylate and propoxylated acrylates and methacrylates, and other monomers such as ethylene, 1,3-butadiene, isoprene, chloroprene, 1-decene, 1-pentene, and 1-octene. Of these, n-butyl acrylate and 2-ethylhexyl acrylate are usually preferred with n-butyl acrylate being particularly preferred. The proportion of polymerised units of the internally plasticising comonomer in the above-mentioned preferred copolymer compositions for A is more preferably 40 to 80 weight %.

The proportion of polymerised units of vinyl chloride in the above-mentioned preferred copolymer compositions for A is more preferably 0 to 15 weight %.

The proportion of polymerised units of copolymerisable acid in the above-mentioned preferred copolymer compositions for A is more preferably 0.1 to 8 weight %, still more preferably 0.1 to 5 weight %, and yet more preferably 0.1 to 3 weight %.

The composition of copolymer B should be selected to provide a Tg in the range from 0° to 80° C., and more preferably in the range from 2° to 60° C. Typical ranges for copolymer B are 0° to 30° C. or 2° to 30° C. as in European Patent Publication 011968.

Preferred copolymer compositions for B include the copolymers comprising 10 to 70 weight % of polymerised units of vinylidene chloride, 2 to 90 weight % of polymerised units of at least one comonomer selected from alkyl acrylates and methacrylates having 1 to 12 carbon atoms in the alkyl groups, alkoxyalkyl acrylates and methacrylates having 1 to 12 carbon atoms in the alkyl groups, styrene, acrylonitrile, vinyl acetate and vinyl ethyl ether; 0 to 50 weight % of polymerised units of vinyl chloride, and 0 to 10 weight % of polymerised units of at least one copolymerisable ethylenically unsaturated acid. Minor amounts of polymerised units of at least one other ethylenically unsaturated monomers may optionally be included in these preferred polymeric compositions of B (e.g. 0 to 40 weight %, more preferably 0 to 30 weight %).

The proportion of polymerised units of vinylidene chloride in the above-mentioned preferred copolymer compositions for B is more preferably 35 to 70 weight %.

The proportion of polymerised units of the at least one comonomer (selected from alkyl acrylates and methacrylates having 1 to 12 carbon atoms in the alkyl group, alkoxyalkyl acrylates and methacrylates having 1 to 12 carbon atoms in the alkyl groups, styrene, acrylonitrile, vinyl acetate and vinyl ethyl ether) in the above-mentioned preferred copolymer compositions for B is more preferably 5 to 90 weight %, and still more Preferably 5 to 70 weight %.

The proportion of polymerised units of vinyl chloride in the above-mentioned preferred copolymer compositions for B is more preferably 0 to 30 weight %.

The proportion of polymerised units of the copolymerisable acid in the above-mentioned preferred copolymer compositions for B is more preferably 0.1 to 8 weight %, still more preferably 0.1 to 5 weight %, and yet more preferably 0.1 to 3 weight %.

The copolymer B may include polymerised units of at least one internally plasticising comonomer, particularly certain kinds of alkyl and alkoxyalkyl acrylates as exemplified by the list provided above in respect of copolymer A, in order to readily achieve a desired value for Tg within the defined range. Such alkyl and alkoxyalkyl acrylates as exemplified above fall within the scope of the said alkyl and alkoxyalkyl acrylates having 1 to 12 carbon atoms in the alkyl group as set out above in the list of comonomers at least one of which may be used to form the polymerised units in copolymer B. The copolymer B may of course include polymerised units of at least one monomer, selected from monomers within the scope of alkyl acrylates and methacrylates and alkoxyalkyl acrylates and methacrylates having 1 to 12 carbon atoms in the alkyl group, which is not an internally plasticising comonomer. In some embodiments the copolymer B includes units of at least one monomer of the non-internally-plasticising type (e.g. Tg > −40° C.), selected from monomers within the scope of alkyl acrylates and methacrylates having 1 to 12 carbon atoms in the alkyl group and alkoxyalkyl acrylates and methacrylates having 1 to 12 carbon atoms in the alkyl group, and at least one internally plasticising comonomer, selected from monomers within the scope of alkyl and alkoxyalkyl acrylates having 1 to 12 carbon atoms in the alkyl group.

In copolymer B, the at least one comonomer selected from alkyl acrylates and methacrylates having 1 to 12 carbon atoms in the alkyl group, alkoxyalkyl acrylates and methacrylates having 1 to 12 carbon atoms in the alkyl group, styrene, acrylonitrile, vinyl acetate and vinyl ethyl ether, is preferably at least one comonomer selected from alkyl acrylates and methacrylates having 1 to 12 carbon atoms in the alkyl group. Example of such alkyl acrylates and methacrylates include n-butyl acrylate and methacrylate, sec-butyl acrylate, tert-butyl acrylate, cyclohexyl acrylate and methacrylate, n-dodecyl acrylate and methacrylate, ethyl acrylate and methacrylate, 5-ethyl-2-nonyl acrylate, 2-ethylbutyl acrylate, n-heptyl acrylate, n-hexyl acrylate, isobutyl acrylate and methacrylate, isopropyl acrylate and methacrylate, methyl acrylate and methacrylate, 2-methylbutyl acrylate, 3-methylbutyl acrylate, n-octyl acrylate and methacrylate, 2-octyl acrylate, 3-pentyl acrylate and methacrylate, n-propyl acrylate, and 2-ethylhexyl acrylate and methacrylate. As discussed above, some of these monomers are of the internally plasticising type while others are of the non-internally-plasticising type; both types of monomer may be used, either together or alone. Preferably, the at least one comonomer selected from said alkyl acrylates and methacrylates having 1 to 12 carbon atoms in the alkyl group is at least one of methyl methacrylate, n-butyl acrylate and 2-ethylhexyl acrylate; most preferably said at least one comonomer is methyl methacrylate together with n-butyl acrylate.

The copolymer A and/or the copolymer B of the present invention may optionally contain polymerised units of at least one multi-functional comonomer that has effected, when present, a partial (in the sense of a degree of) cross-linking during the polymerisation (resulting in the formation of some insoluble gel), as this can sometimes improve the creep performance properties of the copolymer. Multi-functional comonomers providing this type of crosslinking are polyunsaturated monomers examples of which include allyl methacrylate, diallyl maleate, diallyl phthalate and divinyl benzene.

Thus units of such multi-functional comonomers can be present in an amount usually in the range of up to 10 weight %, i.e. the copolymer may comprise 0 to 10 weight %, (preferably 0.01 to 5 weight %). Nevertheless, even though such cross-linking may be used, it is not usually preferred that a copolymer A and/or B according to composition of the invention contains such polymerised units; this is because the partial cross-linking effected during polymerisation sometimes adversely effects the contactability properties of the resulting composition, and, although a small degree of such cross-linking can be tolerated, it is not recommended as a general rule.

Besides optionally including polymerised units of at least one multi-functional comonomer which causes cross-linking during polymerisation, the copolymer A and/or B of the invention may also optionally possess polymerised units of at least one comonomer which provides a latent cross-linking functionality; a latent cross-linking functionality is one where the functional group or groups of the comonomer cause cross-linking not during polymerisation but subsequent to polymerisation (e.g. on or after bond formation), and this can also sometimes enhance the creep properties of the copolymer composition. The latent cross-linking functionality can be one which is activated by the presence in the composition of a cross-linking agent (e.g. a divalent metal ion such as zinc) or can be one which is activated without the requirement for a cross-linking agent e.g. spontaneously at ambient temperature on ageing or more usually under the influence of heat. Examples of comonomers having a latent type of cross-linking functionality where latent cross-linking is possible either at ambient temperature on ageing, or by heating, or by virtue of an externally added cross-linking agent or by more than one of these possibilities, have functional groups capable of cross-linking by various mechanisms including self cross-linking or mutual cross-linking by different functional groups, both in the polymer chain; examples of comonomers providing this type of cross-linking funtionality include comonomers having reactive polar groups such as hydroxyl, thiol, amino, amide, isocyanate, nitrile, carboxy, and epoxide groups. Examples of such comonomers include glycidyl methacrylate and acrylate, methylaminoethyl methacrylate and acrylate, t-butylaminoethyl methacrylate and acrylate, methacrylamide, 4-pentanoguanamine, hydroxylalkyl esters such as hydroxypropyl methacrylate, hydroxyethyl methacrylate and hydroxyethyl acrylate, methacrylonitrile, N-alkoxyalkyl amides such as methoxymethyl methacrylamide and butoxy-methyl acrylamide, and hydroxyalkyl amides such as N-methylol methacrylamide and N-methylol acrylamide, and dicarboxylic acids such as maleic acid. The at least one monomer to provide a latent cross-linking functionality is usually used in an amount to provide 0 to 10 weight % and, if present, usually 0.01 to 10 weight % of polymerised units in the copolymers A and B.

In the copolymers A and B in the compositions of the invention the at least one ethylenically unsaturated copolymerisable acid, if used, which primarily provides an adhesion-promoting functionality, is preferably an ethylenically unsaturated carboxylic acid or a sulphonic acid, such as 2-acrylamide-2-methylpropane sulphonic acid. Particularly preferred acids are aliphatic alpha, beta-unsaturated carboxylic acids and especially acrylic acid; other carboxylic acids of this type which may be used include methacrylic acid, itaconic acid and citraconic acid. Other monomers which provide an adhesion-promoting functionality may be used in conjunction with or in place of the ethylenically unsaturated acid (e.g. in an amount of 0 to 10 weight %). It may be mentioned that the at least one ethylenically unsaturated carboxylic acid can also provide units which impart a latent cross-linking functionality as discussed above if the composition includes a cross-linking agent.

The polymerisations to form the copolymers A and B may be carried out by known emulsion polymerisation techniques; e.g. copolymerisation in an aqueous medium using a free radical-yielding initiator, and usually in the presence of a surface active agent.

A modal molecular weight $M_p$ within the range 100,000 to 700,000 for the vinylidene chloride copolymer A of the invention may be achieved by appropriate adjustment of the polymerisation process to produce polymer of higher than usual molecular weight. For example, molecular weight can be increased by decreasing the polymerisation temperature; however a decrease in temperature below about 40° C. may not be commercially attractive because heat transfer becomes difficult, with the result that long polymerisation reaction times and/or very low cooling water temperatures are required.

One effective method of increasing molecular weight to enable a modal molecular weight $M_p$ within the defined range to be attained at the usual commercially attractive polymerisation temperatures (e.g. 40° to 70° C.) entails performing the polymerisation in such a way that the polymerisation is 'monomer-flooded' for at least a substantial part, say at least 20%, of the polymerisation. By the term 'monomer-flooded' is meant that at any given instant during which the polymerisation is in this state then there is a significant proportion of free, unpolymerised monomeric material present in the reaction medium (say more than 5% by weight based on the weight of polymer plus monomer in the reaction medium at that instant). Preferably the polymerisation is monomer-flooded for, say, at least 40% of the polymerisation.

By contrast, vinylidene chloride-based copolymerisations are often performed under monomer-starved conditions for most of the polymerisation (i.e. the polymerisation is not monomer-flooded for most (say more than 80%) of the polymerisation) in order to obtain a homogeneous copolymer or in order to minimise reaction pressure. (It may be mentioned here that all the exemplified copolymers A and B in our European Patent Publication Nos. 0119668 and 0119669 were performed under monomer starved conditions). A typical procedure would be to add 5 to 20% by weight, based on total monomeric material to be polymerised, of an initial monomer mixture to the reaction vessel and to react these monomers to an high degree of conversion (say to at least 95% conversion), and to then feed the remaining monomers at a rate such that the free monomer concentration in the reaction medium does not rise during this stage of the polymerisation. Often, the initially introduced monomers are reacted to a very high conversion to form what is referred to as a seed latex. Such monomer-starved vinylidene chloride-based copolymerisations when used in an attempt to produce copolymers according to the invention do not generally yield molecular weights of 100,000 or above at reaction temperatures of 40° C. or above.

The proportion of free monomer present at any moment of time during polymerisation can be determined by sampling the polymerisation vessel, e.g. by using a pressure-tight sample bomb, and analysing for free unpolymerised monomer by gas-liquid chromatography. In practice a far simpler method to determine whether a polymerisation is monomer-flooded or monomer-starved at any stage of the polymerisation is to allow the polymerisation to proceed as before but to introduce no additional monomer. If the polymerisation is monomer-starved the polymerisation reaction will die away quite quickly (e.g., within 2–10 minutes). On the other hand, if the polymerisation is monomer flooded the reaction will continue unaffected over this time scale.

There are various ways of ensuring that the polymerisation is monomer-flooded for a substantial proportion of the polymerisation, e.g.:

(A) Addition of more than, say, 20% (by weight) of the monomers to be polymerised, but less than the total amount to ne polymerised, to the reaction vessel before the start of polymerisation and commencement of monomer feeding before the initial monomer mixture has reacted to a high degree of conversion. It is desirable in this variant to feed the remainder of the monomeric material at such a rate that the polymerisation remains monomer-flooded as defined above. In practice this monomer-flooded condition is maintained by controlling the rate of monomer addition relative to the rate of initiation. If however a large proportion of the monomer mixture (say more than 40% by weight of the total monomers to be polymerised) is added to the reaction vessel before the start of polymerisation, then it will be appreciated that it is less important, though nevertheless desirable, that the subsequent monomer-fedding stage of the polymerisation is maintaned in a monomer flooded state because high molecular weight polymer will be produced during the initial stage of the polymerisation.

(B) In an especially preferred method, monomer-flooding is ensured for a substantial proportion of the polymerisation by performing a series of separate monomer introductions often of equal weight and composition (discontinuous monomer feeding). Thus, for example, the monomer mixture to be polymerised is divided into a number of equal portions (e.g. 5 to 10), one portion is added to the reaction vessel and polymerisation is commenced. This portion is then reacted to, say, greater than 90% conversion and a second portion of the monomer mixture is then added. This procedure is repeated until all the monomers have been introduced and polymerisation completed. This variant has the advantage of giving both high molecular weight and good colloid stability (i.e. low coagulum formation) and can be employed to give the desired modal molecular weight Mp within the defined range at the usual commercially attractive polymerisation temperatures (e.g. 40° to 70° C.).

It will be appreciated that the above two described techniques are only examples of how the polymerisation might be operated in a monomer-flooded condition, and that there are other possible detailed modifications of the procedure that could be employed to achieve the same objective.

The copolymer A used in the composition of the invention may optionally include a minor fraction (say up to 30% by weight) of much lower molecular weight than that of the rest of the copolymer having Mp well above 100,000; this may further enhance the contactability of the composition, although the effect is not always apparent. The production of such a copolymer A may be conveniently effected by conducting the copolymerisation to form copolymer A under conditions to give high molecular weight material, e.g. using monomer-flooded conditions, until most of the comonomers for the copolymerisation have been converted to copolymer (say 70 to 90% by weight) and then changing the polymerisation conditions so that the last part of the copolymerisation is performed under conditions to give low molecular weight material, e.g. using monomer-starved conditions and adding a chain transfer agent, thereby yielding the minor low molecular weight fraction.

The modal molecular weight of the copolymer B is not critical; typically Mp for copolymer B may be well below 100,000.

The aqueous latex composition of the invention preferably contains at least one tackifying resin in order to maximise the contact adhesive performance of the composition. A tackifying resin is a polymeric substance, usually a particular type of condensation polymer, known to the art for further improving the adhesive performance of adhesion-promoting polymers.

Therefore according to a further aspect of the invention there is provided an aqueous latex composition as defined above, wherein said composition includes at least one tackifying resin.

The at least one tackifying resin if employed is normally present in an amount of 5 to 100%, more usually 10 to 60% by weight, based on the combined dry weight of the copolymers A and B. Suitable tackifying resins include phenolic resins such as heat reactive alkylphenol/formaldehyde resins, hydroxyalkylated alkylphenol/formaldehyde resins, polyhydric phenol/formaldehyde resins, polyhydric, polynuclear phenol/formaldehyde resins, phenol/formaldehyde resins, and thermoplastic terpene/phenolic resins. The tackifying resin is preferably incorporated by simply mixing into the composition (with appropriate agitation, e.g. stirring) an aqueous dispersion of the tackifying resin, although the resin can be emulsified in-situ.

The aqueous latex composition of the invention may also include substances such as thickeners, stabilizers, humectants, fillers, surfactants, pigments, dyes, fungicides, coalescing agents, cross-linking agents, and/or other material required for any particular application. Such substances (if used) may be incorporated or formulated into the latex compositions of the present invention by any suitable technique, e.g. by simple mixing and stirring.

The composition of the present invention may be used to provide contact adhesion for a variety of substrates, the materials joined either being the same or (more usually) different. Such substrates include wood, paper, natural or artificial textiles, various forms of panelling such as plyboard, particleboard, plasterboard, various plastics materials, various minerals such as glass, asbestos, carbon fibre, concrete, plaster and ceramics, and metals such as iron, steel and aluminium.

The present invention is illustrated by the following examples; the prefix C in an example denotes a comparative example; unless otherwise specified all parts, percentages, and ratios are on a weight basis.

Contactability in the examples is assessed by applying two brush coats of the aqueous latex composition (intended to provide the contact adhesive) to unproofed cotton duck (i.e. unproofed canvas), allowing the first brush coat to dry as indicated by a clearness of the adhesive film before applying the second coat. When the second adhesive coat is dry the coated surfaces are brought together under light hand roller pressure to form the adhesive bond the strength of which is then tested immediately as a 25 mm wide strip on an Instron tensile testing machine set at a crosshead speed of 10 cm/minute. By considering the initial bond strength it is possible to determine whether interfilm coalescence has occurred and hence whether or not the adhesive is contactable.

Creep at elevated temperatures or creep resistance unless otherwise specified is determined by preparing a test specimen as for contactability but ageing for 7 days prior to testing. Creep resistance is assessed by equilibrating the sample at 60° C. and recording the distance peeled or crept in mm/minute under a static load of 1 kg. 7-Day Bond Strength is determined by preparing a test speciman as for contactability but leaving to age for 7 days prior to testing for bond strength.

7-Day Shear Strength is determined by preparing a 25 mm square lap joint from 4.5 inch x 1 inch x 0.25 inch Beechwood test strips conforming to Appendix A of BS 1204, 1956. 0.15 ml of adhesive composition is applied to each surface to be contacted and allowed to dry before contacting. The bond is aged for 7 days prior to testing on an Instron tensile testing machine at a withdrawal rate of 5 mm/minute.

The procedure for measurement of modal molecular weights Mp of the copolymers exemplified (as defined hereinbefore) involved dissolving 0.02 g of polymer in 10 ml of H.P.L.C. grade tetrahydrofuran and after filtration through a 0.2 micron membrane injecting on to the gel permeation chromatograph at a solvent flow rate of 1 ml/minute and a temperature of 40° C. The weight of polymer eluted from the chromatograph was measured using an Applied Chromatograph Services mass detector, and was plotted as a function of elution time.

Tg's for the copolymers were determined by differential scanning calorimetry.

The key to the monomer notation used in the examples is as follows:

| | |
|---|---|
| VDC | vinylidene chloride |
| BA | n-butyl acrylate |
| AA | acrylic acid |
| EHA | 2-ethylhexyl acrylate |
| MMA | methyl methacrylate |
| BMA | n-butyl methacrylate |
| IA | itaconic acid |

EXAMPLE 1 TO 15, C16 to C19

A series of VDC copolymers were prepared for use as copolymer A according to the invention in Examples 1 to 7 (for properties, see following Table 1). They were all amorphous and were formed using emulsion polymerisation under monomer-flooded conditions so as to obtain Mp's above 100,000.

TABLE 1

| Copolymer A composition | Tg °C. | Mp | For use in Ex. No. |
|---|---|---|---|
| VDC/BA/AA 27.1/70.9/2.0 | −12 | 129128 | 1 |
| VDC/BA/AA 26.7/71.3/2.0 | −15 | 105895 | 2 |
| VDC/BA/AA 27.1/70.9/2.0 | −13 | 115416 | 3 |
| VDC/BA/AA 27.9/70.1/2.0 | −13 | 158640 | 4 |
| VDC/BA/AA 29.7/68.3/2.0 | −11 | 135313 | 5 |
| VDC/BA/AA 29.8/68.2/2.0 | −11 | 268651 | 6 |
| VDC/BA/AA 29.3/68.7/2.0 | −9 | 330318 | 7 |
| VDC/EHA/BMA/AA 27.6/42.4/28.0/2.0 | −20.5 | 109411 | 8 |
| VDC/BA/AA 27.3/70.7/2.0 | −13 | 124803 | 9 |
| VDC/BA/AA 27.6/70.4/2.0 | −17 | 125215 | 10 |
| VDC/BA/AA 29.5/68.5/2.0 | −7 | 121700 | 11 |
| VDC/BA/AA 20.1/77.9/2.0 | −20 | 123410 | 12 |
| VDC/BA/IA 25.5/72.2/2.0 | −25 | 167853 | 13 |
| VDC/BA/AA 27.2/70.8/2.0 | −13 | 114898 | 14 and 15 |

A second series of VDC copolymers (copolymers A[1]) were prepared for use in Examples C8 to C10 (i.e. not according to the invention) (for properties, see Table 2 following). They were all amorphous and were prepared using emulsion polymerisation under monomer-starved conditions so as to obtain Mp's below 100,000.

TABLE 2

| Copolymer A[1] composition | Tg °C. | Mp | For use in Ex. No. |
|---|---|---|---|
| VDC/BA/AA 26.9/71.1/2.0 | −13 | 85655 | C16 |
| VDC/BA/AA 28.3/69.7/2.0 | −11 | 64477 | C17 |
| VDC/EHA/EA/AA 25.2/41.6/31.2/2.0 | −15 | 89752 | C18 |
| VDC/BA/AA 33.3/64.7/2.0 | −5 | 73715 | C19 |

It will be noted that the copolymers for use in Examples C16 and C17 (particularly the latter) were very similar to Example C3 of European Patent Publication No. 0119698 (also prepared under monomer-starved conditions).

Several VDC copolymers were prepared (as aqueous emulsions) for use as copolymer B in Examples 1 to 15 C16 to C19 (as indicated in the following Table 3). They were all amorphous and prepared under monomer-starved conditions.

TABLE 3

| Copolymer B composition | Tg °C. | Mp | For use in Ex. No. |
|---|---|---|---|
| VDC/BA/MMA/AA 56.1/28.9/14.8/2.0 | +20 | 34,340 | 1 to 7, C16, C17 |
| VDC/BA/MMA/AA 57.6/26.7/13.7/2.0 | +20 | 40,793 | C18 |
| VDC/BA/MMA/AA 57.3/27.0/13.7/2.0 | +22 | 37596 | 8 and 13 |
| VDC/BA/MMA/AA 58.4/26.2/13.4/2.0 | +23 | 31033 | 9 |
| VDC/BA/MMA/AA 58.2/26.3/13.5/2.0 | +22 | 40542 | 10 |
| VDC/BA/MMA/AA 56.1/28.9/14.8/2.0 | +20 | 34340 | 11 and C19 |
| VDC/BA/MMA/AA 56.9/27.5/14.1/2.0 | +20 | 35913 | 12 |
| VDC/BA/MMA/AA 59.3/15.3/23.4/2.0 | +36 | 28099 | 14 |

TABLE 3-continued

| Copolymer B composition | Tg °C. | Mp | For use in Ex. No. |
|---|---|---|---|
| VDC/BA/MMA/AA 59.4/5.1/33.5/2.0 | +47 | 19171 | 15 |

It will be noted that the first five copolymers in Table 3 were very similar to Example C15 of European Patent Publication No. 0119698 (also prepared under monomer-starved conditions).

Blends of the aqueous latices of copolymers A or $A^1$ with those of copolymers B were prepared to provide aqueous latex compositions according to the invention in Examples 1 to 15 and comparative aqueous latex compositions in Examples C16 to C19, the latices used in each blend being indicated in Tables 1, 2, and 3 above. The ratio of copolymer A or $A^1$ to copolymer B in each blend (dry weight ratio of latex solids) was 68.8/31.2 w/w in Examples 1 to 7, 11, 12, 14, 15, C16 and C17; 70/30 in Examples 8 to 10, 13 and C18; and 75/25 in Example C19. The aqueous blend compositions were formulated with commercially available phenolic tackifying resin aqueous dispersions, Ucar Phenolic Resin dispersion BKUA 2370 (manufactured by Union Carbide) being used in Examples 1 to 7, 11, 12, 14, 15, and C16 to C19 and the grade SMD 3402 (manufactured by Schenectady-Midland) being used in Examples 8 to 10 and 13; formulation was effected in each case by mixing and stirring to give a polymer/resin ratio of 3/1 w/w solids. The resulting formulations of the latex blend compositions were tested for contact adhesive performance as indicated in the following Table 4.

| Ex. No. | Contactability N | 7-Day Bond Strength N | Creep mm/min (1 kg) | 7-Day Shear Strength N |
|---|---|---|---|---|
| 1 | 33.8 | 37.8 | 0.9 | 1678 |
| 2 | 30.1 | 50.1 | 2.7 | 1471 |
| 3 | 29.9 | 61.2 | 0.3 | 1418 |
| 4 | 28.8 | 48.1 | 0.7 | 2192 |
| 5 | 11.0 | 44.8 | 2.4 | 2213 |
| 6 | 17.5 | 75.1 | 3.2 | 1738 |
| 7 | 27.8 | 56.4 | 10.7 | 2376 |
| 8 | 15.0 | 71.0 | 9.8 | 1544 |
| 9 | 33.6 | 55.2 | 2.1 | 3101 |
| 10 | 45.8 | 74.9 | 4.6 | 2341 |
| 11 | 18.5 | 37.2 | 2.4 | 2251 |
| 12 | 17.8 | 58.4 | 1.3 | 2462 |
| 13 | 32.1 | 87.3 | 6.5 | 2732 |
| 14 | 34.9 | 41.7 | 5.3 | 2099 |
| 15 | 33.9 | 31.5 | 1.8 | 2174 |
| C16 | 33.5 | 46.9 | 12.5 | 1263 |
| C17 | 24.4 | 52.9 | 2.3 | 1126 |
| C18 | 30.6 | 70.2 | 27.0 | 789 |
| C19 | 14.0 | 25.6 | 20.0 | 1903 |

It is seen that the compositions according to the invention provided an excellent balance of contact adhesive properties and in partciular exhibited consistently improved combinations of 7-day shear strength and creep resistance in comparison to the comparative compositions.

EXAMPLE 20

A further example of a copolymer A for use according to the invention, having a composition and Tg similar to the copolymer A used for Example 4, was prepared using monomer-flooded conditions until a conversion of monomers to copolymer of about 80% by weight had been reached at which stage the polymer had Mp of 136,138. The remaining part of the polymerisation was carried out under monomer-starved conditions in the presence of 2% lauryl mercaptan as chain transfer agent thereby introducing a minor amount of a low molecular weight fraction into the molecular weight distribution.

The copolymer A was blended 70/30 w/w with the latex of copolymer B used for Example C18. The aqueous blend composition was formulated with the tackifying phenolic resin SMD 3402 (manufactured by Schenectady Midland) to give a polymer/resin ratio of 3/1 w/w solids. The resulting formulation was tested for contact adhesive performance, the results being as follows:

| Contactability | 24.6 N |
|---|---|
| 7-Day Bond Strength | 63.2 N |
| Creep | 4.4 mm/min (1 kg) |
| 7-Day Shear Strength | 2180 N |

An excellent balance of contact adhesive properties was thus achieved.

EXAMPLES C21

This example demonstrates that an aqueous latex composition provided by blending a copolymer of type $A^1$ (i.e. with Mp below 100,000) and a copolymer of type B having a high value of Mp (i.e. above 100,000, unlike n the preceding examples where all the copolymers type B have had Mp below 100,000) does not possess the improved combination of 7-day strength and creep resistance shown by the compositions according to the present invention.

The copolymer of type $A^1$ used was the same copolymer used in Example C16, i.e. having the following composition and properties:

VDC/BA/AA; Tg $-13°$ C.; Mp 85655; 26.9/71.1/2.0.

The high Mp copolymer of type B used had the following composition and properties:

VDC/BA/AA; Tg $+7°$ C.; Mp 100463; 59.4/38.6/2.0.

The latices were blended in the ratio (dry weight) 70/30 as before and formulated with the phenolic resin BKUA 2370 (to give a polymer/resin ratio of 3/1 w/w solids) also as before. The resulting composition was tested for contact adhesive performance, the results being as follows:

| Contactability | 15.7 N |
|---|---|
| 7-Day Bond Strength | 90.6 N |
| Creep | 6.6 mm/min (1 Kg); 32.0 mm/min (2 Kg) |
| 7-Day Shear Strength | 998 N |

We claim:

1. An aqueous latex composition comprising at least one copolymer A and at least one copolymer B, wherein:

A is an amorphous copolymer comprising 10 to 70 weight % of polymerised units of vinylidene chloride, 30 to 90 weight % of polymerised units of said at least one internally plasticising comonomer, 0 to 20 weight % of polymerised units of vinyl chloride, and 0 to 10 weight % of polymerised units of at least one copolymerisable ethylenically unsaturated acid and which copolymer A has a Tg in the range −50° to <0° C.; and B is an amorphous copolymer comprising 10 to 70 weight % of polymerised units of vinylidene chloride; 2 to 90 weight % of polymerised units of at least one comonomer selected from alkyl acrylates and methacrylates having 1 to 12 carbon atoms in the alkyl group, alkoxyalkyl acrylates and methacrylates having 1 to 12 carbon atoms in the alkyl groups, styrene, acrylonitrile, vinyl acetate and vinyl ethyl ether; 0 to 50 weight % of polymerised units of vinyl chloride; and 0 to 10 weight % of polymerised units of at least one ethylenically unsaturated acid; and which copolymer B has a Tg in the range from 0° to 80° C.

and wherein the dry weight ratio of the at least one copolymer A: the at least one copolymer B is from 95:5 to 10:90;

and wherein said at least one copolymer A has a modal molecular weight Mp (as herein defined) within the range 100,000 to 700,000;

and wherein said composition provides contactable layers after drying.

2. An aqueous latex composition according to claim 1 wherein said at least on copolymer A comprises polymerised units of at least one copolymerisable ethylenically unsaturated acid.

3. An aqueous latex composition according to claim 2 wherein said at least one copolymer B comprises polymerised units of at least one copolymerisable unsaturated acid 4. An aqueous latex composition according to claim 1 wherein the weight ratio of said at least one copolymer A: said at least one copolymer B is from 85:15 to 15:85.

5. An aqueous latex composition according to claim 1 wherein the Tg of said at least one copolymer A is in the range from −40° to −5° C.

6. An aqueous latex composition according to claim 1 wherein the proportion of polymerised units of vinylidene chloride units in copolymer A is 20 to 60 weight %.

7. An aqueous latex composition according to claim 6 wherein the proportion of polymerised units of said at least one internally plasticising comonomer in copolymer A is 40 to 80 weight %.

8. An aqueous latex composition according to claim 7 wherein the proportion of polymerised units of said at least one ethylenically unsaturated acid is 0.1 to 8 weight %.

9. An aqueous latex composition according to claim 1 wherein the at least one internally plasticising comonomer is selected from n-butyl acrylate and 2-ethylhexyl acrylate.

10. An aqueous latex composition according to claim 1 wherein the Mp of said at least one copolymer A is in the range of from 100,000 to 500,000.

11. An aqueous latex composition according to claim 1 wherein the Tg of said at least one copolymer B is in the range of from 2° to 60° C.

12. An aqueous latex composition according to claim 1 wherein the proportion of polymerised units of vinylidene chloride in said at least one copolymer B is 35 to 70 weight %.

13. An aqueous latex composition according to claim 12 wherein the proportion of polymerised units of said at least one comonomer selected from alkyl acrylates and methacrylates having 1 to 12 carbon atoms in the alkyl groups, alkoxyalkyl acrylates and methacrylates have 1 to 12 carbon atoms in the alkyl groups, styrene, acrylonitrile, vinyl acetate, and vinyl ethyl ether, is 5 to 90 weight %.

14. An aqueous latex composition according to claim 13 wherein the proportion of polymerised units of said at least one ethylenically unsaturated acid is 0.1 to 8 weight %.

15. An aqueous latex composition according to claim 1 wherein said at least one copolymer B includes polymerised units of at least one internally plasticising comonomer.

16. An aqueous latex composition according to claim 1 wherein said at least one copolymer B includes units of at least one comonomer within the scope of alkyl acrylates and methacrylates having 1 to 12 carbon atoms in the alkyl group and alkoxyalkyl acrylates and methacrylates having 1 to 12 carbon atoms in the alkyl group which comonomer is not an internally plasticising comonomer.

17. An aqueous latex composition according to claim 1 wherein the at least one comonomer providing polymerised units in copolymer B selected from alkyl acrylates and methacrylates having 1 to 12 carbon atoms in the alkyl group, alkoxyalkyl acrylates and methacrylates having 1 to 12 carbon atoms in the alkyl groups, styrene, acrylonitrile, vinyl acetate, and vinyl ethyl ether, is at least one alkyl acrylate or methacrylate having 1 to 12 carbon atoms in the alkyl group.

18. An aqueous latex composition according to claim 1 wherein said at least one comonomer providing polymerised units in copolymer B selected from alkyl acrylates and methacrylates having 1 to 12 carbon atoms in the alkyl group is at least one of methyl methacrylate, n-butyl acrylate and 2-ethylhexyl acrylate.

19. An aqueous latex composition according to claim 18 wherein said at least one comonomer in copolymer B is methyl methacrylate together with n-butyl acrylate.

20. An aqueous latex composition according to claim 1 wherein copolymer A and/or copolymer B comprise polymerised units of at least one copolymerisable ethylenically unsaturated acid selected from an ethylenically unsaturated carboxylic acid or sulphonic acid.

21. An aqueous latex composition according to claim 20 wherein said acid is an aliphatic alpha, beta unsaturated carboxylic acid.

22. An aqueous latex composition according to claim 1 wherein said copolymer A and/or copolymer B comprise polymerised units of at least one type of comonomer to provide a cross-linking functionality.

23. An aqueous latex composition according to claim 1 wherein said composition includes at least one tackifying resin.

24. An aqueous latex composition according to claim 1 wherein said copolymer A has been formed by a monomer-flooded polymerisation process.

25. A process of contact bonding which comprises coating two substrates to be bonded with an aqueous latex composition according to claim 1; allowing the aqueous-based coating on each substrate to dry; and bringing the dry coated substrate into contact to affect contact bonding.

* * * * *